United States Patent
Rao et al.

(10) Patent No.: US 12,132,727 B2
(45) Date of Patent: Oct. 29, 2024

(54) REDUCING FALSE POSITIVES IN ENTITY MATCHING BASED ON IMAGE-LINKING GRAPHS

(71) Applicant: PAYPAL, INC., San Jose, CA (US)

(72) Inventors: Ramnarayan Vijapur Gopinath Rao, Chennai (IN); Rajkumar Baskaran, Vellore (IN); Rishabh Goel, Palwal (IN)

(73) Assignee: PAYPAL, INC., San Jose, CA (US)

( * ) Notice: Subject to any disclaimer, the term of this patent is extended or adjusted under 35 U.S.C. 154(b) by 217 days.

(21) Appl. No.: 17/824,539

(22) Filed: May 25, 2022

(65) Prior Publication Data

US 2023/0403268 A1    Dec. 14, 2023

(51) Int. Cl.
*H04L 9/40* (2022.01)
*G06F 16/532* (2019.01)
*G06V 40/16* (2022.01)

(52) U.S. Cl.
CPC ........ *H04L 63/0861* (2013.01); *G06F 16/532* (2019.01); *G06V 40/161* (2022.01); *G06V 40/172* (2022.01)

(58) Field of Classification Search
CPC . H04L 63/0861; G06F 16/532; G06V 40/161; G06V 40/172; G06V 20/30
See application file for complete search history.

(56) References Cited

U.S. PATENT DOCUMENTS

| | | | |
|---|---|---|---|
| 10,541,999 B1 * | 1/2020 | Rosenberg | G06V 40/172 |
| 2012/0249787 A1 * | 10/2012 | Allegra | G06V 40/172 348/143 |
| 2014/0172881 A1 | 6/2014 | Petrou et al. | |
| 2015/0131872 A1 | 5/2015 | Ganong et al. | |
| 2016/0224871 A1 | 8/2016 | Koren et al. | |
| 2017/0064363 A1 * | 3/2017 | Wexler | H04L 67/306 |
| 2017/0118207 A1 | 4/2017 | Madhu et al. | |
| 2017/0195323 A1 * | 7/2017 | Wang | H04L 9/40 |
| 2019/0295203 A1 * | 9/2019 | Cho | G06Q 20/4016 |
| 2019/0297091 A1 | 9/2019 | Kirkham et al. | |
| 2020/0356994 A1 | 11/2020 | Rao et al. | |

OTHER PUBLICATIONS

Pantic et al., "Dynamics of Facial Expression: Recognition of Facial Actions and Their Temporal Segments From Face Profile Image Sequences", Mar. 2006, IEEE Transactions on Systems, Man, and Cybernetics, Part B, vol. 36, No. 2, pp. 433-449 (Year: 2006).*
International Search Report and Written Opinion for Application No. PCT/US2023/018995 mailed on Jul. 10, 2023, 15 pages.

* cited by examiner

*Primary Examiner* — Kenneth W Chang
(74) *Attorney, Agent, or Firm* — Haynes and Boone, LLP (57) ABSTRACT

Methods and systems are presented for performing comprehensive and accurate matching of user accounts with one or more known entities based on image-linking graphs. Images related to each known entity are retrieved from one or more online sources. Faces are extracted from the images. Based on attributes of the faces in the images, an image-linking graph is generated for the entity. When a user account is determined to be a potential match for the entity based on text-based attributes, an image associated with the account may be obtained. If the image matches with any one of the faces in the image-linking graph, an action is performed to the user account based on a position of the matched face in the image-linking graph.

20 Claims, 5 Drawing Sheets

REDUCING FALSE POSITIVES IN ENTITY MATCHING BASED ON IMAGE-LINKING GRAPHS

BACKGROUND

The present specification generally relates to identity matching, and more specifically, to a framework for reducing false positives in matching user accounts to one or more entities when processing electronic transactions according to various embodiments of the disclosure.

RELATED ART

Identity matching and verification is critical for an organization. For example, when a user registers a new user account with the organization, the organization may verify an identity of the user in order to determine whether the user is associated with a known unfavorable entity (e.g., a known attacker, a known malicious user, etc.), or whether the user is associated with a known favorable entity (e.g., an entity associated with a high-volume account, an important customer of the organization, etc.). Based on the verified identity of the user, the organization may apply different settings to the user account. For example, if the organization determines that the user is associated with a known unfavorable entity, the organization may apply additional restrictions (e.g., data access restrictions, functionality access restriction, etc.) to the user account. On the other hand, if the user is determined to be associated with a favorable entity of the organization, the organization may apply or offer additional features and/or functionalities to the corresponding account.

Conventionally, the identity matching process is performed using text-based attributes associated with the known entities, such as names, nationalities, etc. There are many drawbacks in using such a text-based approach to match users with entities. For example, since the values corresponding to many of the text-based attributes (e.g., names, locations, etc.) are not unique to each user, many users who are not associated with a known entity, but have similar attribute values with the known entity (e.g., a similar name, etc.), may be matched with the known entity, resulting in a high false positive rate. Furthermore, since malicious users usually operate as a group, different users within the group associated with a known entity may not be detected using this text-based approach. Failure or improper detection may result in a number of issues, including fraudulent transactions, data breaches, and cyber attacks. Thus, there is a need for performing a comprehensive and accurate identity detection of users based on one or more known entities.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for performing comprehensive and accurate matching of users with one or more known entities based on image-linking graphs. As discussed herein, using text-based attributes to match users with one or more entities may lead to a high false-positive rate. That is, many users may be incorrectly matched with an entity based on the text-based attributes, which can lead to numerous undesirable consequences. For example, an organization may have a list of known entities (e.g., known favorable entities, known unfavorable entities, etc.). The organization may have access to certain text-based attributes associated with the known entities, such as a name, a nationality, an age, etc. Each entity in the list of known entities may represent a person or an organization.

In some embodiments, an identity matching system of the organization may determine whether any user accounts with the organization is associated with any of the known entities based on the text-based attributes. For example, the identity matching system may retrieve information associated with a user account (e.g., a user profile of the user account). The identity matching system may also identify user information within the user profile that corresponds to the text-based attributes, such as a name of the user, a location of the user, etc. Based on the user information retrieved from the user profile and the information associated with the list of known entities, the identity matching system may determine whether the user account is associated with an entity in the list. For example, if a user profile indicates a name and a location that correspond to the information of an entity in the list, the identity matching system may determine that the corresponding user account is a match with the entity (e.g., is associated with the entity).

However, since many people or organizations share the same text-based attributes as an entity (e.g., "John Smith," "Mary Lee," etc.), the identity matching system may identify a large number of users (e.g., above a threshold) that share the same text-based attributes with an entity, many of which may not be associated with the entity. Thus, if the organization applies account configurations (e.g., additional restrictions, features, and/or functionalities) to all of the matched user accounts, user experiences of the users that are not associated with the entity but are matched with the entity may be affected.

As such, according to various embodiments of the disclosure, after matching a user account with an entity using the text-based approach, the identity matching system may verify that the user account is associated with the entity based on an image-linking graph. In some embodiments, the identity matching system may retrieve, for each entity in the list of known entities, images corresponding to the entity. For example, the identity matching system may include a web crawler that searches for photos related to the entity on the Internet. The content may include news articles related to the entity posted on the Internet (e.g., news articles that include the name of the entity), social media posts associated with the entity or images in which the entity is tagged, etc. The identity matching system may retrieve the photos and store the photos in a data storage.

In some embodiments, the identity matching system may use one or more facial recognition algorithms (e.g., visual geometry group (VGG)-based neural networks, a DeepFace recognition, support vector machines, a principal component analysis, a linear discriminant analysis, kernel methods, trace transforms, etc.) to extract facial features of the persons appearing in the photos. The extracted facial features may include multiple parameters corresponding to different feature attributes. For example, feature attributes may include the length and width of a face, the length of the nose, a ratio between the length of the face and the length of the nose, the width of the nose, the width of the lips, the size of the eyes, the size of the eyebrows, etc. In some embodiments, the parameters may include one or more vectors within a multi-dimensional space that represents different facial features.

The identity matching system may also compare the facial features among the persons appearing in the different photos (e.g., different images) related to the entity, such that the identity matching system may determine whether the photos include the same person or different persons. In some embodiments, the identity matching system may use a deep-learning convolutional neural network (CNN) to perform the comparison of facial features between persons who appear in the photos. The deep-learning CNN may indicate whether two faces that appear in the photos correspond to the same person or not. Using the output from the deep-learning CNN, the identity matching system may be able to identify the persons who repeatedly appear in different photos. For example, the identity matching system may assign an identifier to each person that appears in one or more of the photos related to the entity. The identity matching system may then label the person(s) in the photos using the identifiers. Since at least some of the photos may include multiple persons, the identity matching system may identify which person appears in each of the photos and label the persons in the photos using the identifiers. The identity matching system may also associate the extracted facial features from the photos with the corresponding identifier, such that facial features of the same person that are extracted from different photos would be associated with the same identifier. In some embodiments, the identity matching system may merge the facial features extracted from different photos of the same person. For example, the identity matching system may compute an average of the parameters corresponding to each feature attribute extracted from the different images, and store the average as the profile for the corresponding identifier.

In some embodiments, the identity matching system may generate a graph (e.g., an image-linking graph) for the entity based on the faces that appear in the photos related to the entity. For example, the identity matching system may identify a particular person (also referred to as the "leader") who appears most frequently in the photos related to the entity and label the corresponding identifier as being most associated with the entity. The assumption is that the person who appears most frequently in the photos related to the entity is an integral person of the entity (e.g., the person is the entity when the entity is a person, the person is a leader of the entity when the entity is a group/organization, etc.). The identity matching system may put the identifier corresponding to the leader of the entity in a first layer of the graph.

The identity matching system may then identify other people who appear in the same photo(s) as the leader. Since these other people appear in the same photo(s) as the leader who is most associated with the entity, the identity matching system may determine that these other people may also be closely associated with the entity (e.g., friends/family of the entity, other employees of the entity, etc.). Instead of ignoring these other people, the identity matching system may place the identifiers of those people who appear in the same photo(s) with the leader in a second layer of the graph, and link them to the identifier of the leader in the graph. The link between the people in the graph represents relationships between the linked people in real-life.

In some embodiments, the identity matching system may also assign a relatedness score to each of the links in the graph to represent a level of relationship between the linked people in real-life. For example, the identity matching system may determine a relatedness score for a link between two people in the graph based on a frequency that the two people appear together in the same photos, such that the higher the number of photos that include the two people together, the higher the relatedness score. In some embodiments, the identity matching system may generate links between identifiers in the second layer using the same techniques. Using the approach disclosed herein to generate the image-linking graph, the identity matching system may have access to a more comprehensive view of the entity for matching user accounts.

In some embodiments, the identity matching system may continue building out the image-linking graph with additional layers. For example, for each person in the second layer of the image-linking graph, the identity matching system may search for photos that include the person (e.g., photos related to the entity but do not include the leader, images retrieved using a reverse image search, etc.). The identity matching system may then identify the other people who appear in the same photos as the person, and may link those other people in the image-linking graph to the person in a third layer of the image-linking graph. In some embodiments, the identity matching system may continue to add additional layers in the image-linking graph using the same techniques disclosed herein until a predetermined threshold (e.g., 5 layers, 10 layers, etc.) is reached.

After generating the image-linking graphs for each entity in the list, the identity matching system may begin matching user accounts with the entities. For example, the identity matching system may initially use the text-based attributes to find potential matches of user accounts for each entity. As discussed herein, using the text-based approach to match user accounts with an entity may lead to a high false positive rate (a false positive rate above a threshold). Thus, if it is determined that the number of user accounts that are matched with an entity using the text-based approach is above a threshold, which can be dynamic, such as based on the type of user account, the type of entity associated with the account, the number of accounts, etc., the identity matching system may use the image-linking graph to further analyze each potential match to verify whether each of the matched user accounts is indeed associated with the entity.

Furthermore, the image linking graph can be used for false positive reduction periodically (e.g., daily) after a scan runs instead of investigating all alerts manually. For example, the image of the person that caused an alert to be generated can be matched to a corresponding entity's linkage graph using based on the facial features, and if the match is below a threshold level or there is no match at all, the alert can be automatically rejected.

In some embodiments, the identity matching system may access the user profile of a matched user account that has been determined to be a potential match with an entity using the text-based attributes. The identity matching system may retrieve a photo from the user profile. For example, when a user registers a user account with the organization, the organization may require the user to submit a copy (e.g., an image) of an identification document (e.g., a driver's license, a passport, etc.). The identity matching system may extract the photo of the user from the document, and store the photo in the user profile (e.g., using a deep-learning CNN, etc.).

The identity matching system may compare the photo in the user profile against each person in the image-linking graph of the entity (e.g., using a deep-learning CNN, etc.). For example, the identity matching system may also extract facial features of the user from the photo using one or more facial recognition algorithms, and may compare the facial features of the user against the facial features associated with each person (e.g., each identifier) in the image-linking graph. Based on the comparison between the facial features, the identity matching system may determine a probability that the user corresponds to each person associated with the entity (e.g., each person in the image-linking graph). In some embodiments, the identity matching system may determine that the user matches with the entity when the probability that the user corresponds to any person associated with the entity is above a threshold.

Based on a determination that the user matches with the entity, the identity matching system may apply additional configurations to the user account. For example, if the entity is a known unfavorable entity, such as entities in a blacklist, the identity matching system may apply additional restrictions (e.g., data access restrictions, functionality restrictions, etc.) to the user account, or may even suspend or lock the user account. If the entity is a known favorable entity, the identity matching system may apply or offer additional features or functionalities (e.g., ensure a faster processing time, additional functions that are not offered to other user accounts, etc.) to the user account. In some embodiments, the identity matching system may dynamically apply different configurations to the user account based on which person (e.g., the matched person) in the image-linking graph matches the user. For example, when the user of the user account corresponds to the person in the first layer of the image-linking graph (indicating that the user is either the entity or the leader of the entity), the identity matching system may apply or offer an entire set of additional configurations to the user account. However, when the user of the user account corresponds to a person in the second layer of the image-linking graph (indicating that the user is not the entity or the leader of the entity, but someone who is closely associated with the entity), the identity matching system may apply or offer only a portion of the additional configurations (e.g., a subset of additional configurations) to the user account (e.g., only some but not all of the restrictions, etc.). In some embodiments, the portion of the additional configurations that is applied or offered to the user account may be dependent on which layer in the image-linking graph the matched person is located. In some embodiments, the higher the layer that the matched person is located, the smaller portion of additional configurations would be applied or offered to the user account.

In some embodiments, the portion of additional configurations that is applied or offered to the user may also be dependent on the relatedness score(s) that link the matched person to the person in the first layer of the image-linking graph. That is, the more closely the matched person is related to the person in the first layer (i.e., the person that is most associated with the entity), a larger portion of the additional configurations will be applied to the user account. In some embodiments, when the matched person is located in the third (or higher) layer (i.e., the matched person is two-degree or more separated from the person in the first layer), the identity matching system may assign different weights to the different relatedness scores based on the layers that the link associated with the relatedness scores connect, and may calculate a merged score based on the weighted relatedness scores. The identity matching system may then apply or offer the configurations to the user account based on the merged score.

In some embodiments, the identity matching system may analyze newly registered user accounts using the image-linking graphs even without first matching the user accounts with any entity under the text-based approach. Malicious users are known to create multiple user accounts (e.g., using bots, etc.) and may register the user accounts using fictitious information. When asked to provide an identification document or an image of the user, the bot may retrieve an image of a person (e.g., an image of a random person) from the Internet, and may use it for registering the user account. In these scenarios, since the information provided by the malicious users to create the account is not information associated with the actual person associated with the account (e.g., the malicious user), the identity matching system may not be able to match the user accounts with any of the known entities using the text-based attributes. In some embodiments, the identity matching system may determine whether the photo used by the new user account matches with any existing user account. When the identity matching system determines that the photo of the new user account matches with an existing user account, the identity matching system may monitor user data and activities associated with the new user account and the matched account. If any inconsistency is detected between the two accounts (e.g., different names, different ages, transactions that are conducted through the two accounts are inconsistent with each other, etc.), the identity matching system may determine that the new user account may be registered using fraudulent information, and may perform one or more actions (e.g., suspending, locking, etc.) on the new user account.

In some embodiments, the identity matching system may use the image-linking graph to detect whether a malicious operation is conducted using user accounts with the organization through a series of transactions. The series of transactions may be conducted as part of an overarching malicious operation (e.g., a money laundering operation) for the purpose of evading detection. Thus, these malicious operations are generally difficult to detect. In one scenario, a malicious entity may funnel funds through a series of transactions using multiple user accounts with the organization, as part of an overarching money laundering operation. For example, funds may be transferred from a first account to a second account, and then from the second account to a third account, and then from the third account to a fourth account before the funds are withdrawn. If the entire series of transactions are conducted through the organization (e.g., transactions conducted through user accounts with the organization), the organization may detect the malicious behavior by tracing the transactions through the different user accounts involved in the series of transactions. However, the malicious entity may attempt to evade detection by performing at least one transaction in the series of transactions outside of an environment controlled by the organization (e.g., using an account with a different organization, using cash transfer, etc.). For example, after transferring funds from the first account to the second account, the funds may be transferred to an external account (e.g., external to the organization) before transferring back to the third account in the series of transactions.

In some embodiments, when it is determined that a known malicious entity has conducted a transaction (e.g., a seed transaction) through a user account (e.g., the identity matching system may match the user account with the known malicious entity using the techniques disclosed herein, etc.), the identity matching system may trace the downstream (and/or upstream) transactions from the user account of the known malicious entity. In some embodiments, the identity matching system may identify other user accounts that are closely associated with the known malicious entity using the image-linking graph (e.g., user accounts of the people who are determined to be closely related to the entity, such as those people who are in the image-linking graph associated with the entity), and may monitor the transactions conducted through the identified user accounts. The identity matching system may monitor transactions conducted through the user account of the known malicious entity and the identified user accounts determined to be closely associated with the known malicious entity within a period of time (e.g., within an hour, within a day, etc.) from the seed transaction, and may determine whether the transactions conducted by those accounts as a whole correspond to a pattern associated with a malicious behavior (e.g., a money laundering operation). If the transactions correspond to the pattern, the identity matching system may perform one or more actions to the user accounts (e.g., suspending, locking, etc.).

In some embodiments, in addition to matching user accounts to different entities (e.g., favorable entities, unfavorable entities, etc.), the identity matching techniques disclosed herein can also be used in other applications, such as authentication of users in accessing user accounts, linking user accounts across different virtual reality environments, etc. For example, someone other than the person who register the user account may access the user account for different reasons (e.g., a child using a parent's account to make a purchase, an employee using an employer's account to make a purchase etc.). Instead of sharing or creating new account credentials (e.g., sharing passwords, etc.), using facial recognition technology, the identity matching system may determine whether to authorize or deny access to an account based on a photo captured of the requester. In one example, when a requester transmits a request to access a user account (e.g., request to make a payment through the user account, etc.), the identity matching system may prompt the requester for a photo of the requester for authentication purpose. The identity matching system may access the image-linking graph associated with the user account, and attempt to match the photo of the requester with a person in the graph. In some embodiments, while the requester may not match the leader of the user account (e.g., the person in the first layer of the graph), the identity matching system may match the requester to another person in the graph. The identity matching system may then grant the requester a limited access to the user account based on a match with the person in the graph. In some embodiments, the amount of access to the user account may depend on the location of the matched person in the graph. For example, the closer the matched person is to the leader in the graph, access to a larger portion of the user account may be provided to the requester (e.g., a larger payment limit, a larger portion of the functionalities associated with the account, etc.).

In some embodiments, using the identity matching techniques, the identity matching system may link different accounts across different platforms (e.g., different service providers, different virtual reality environments, etc.). For example, different accounts of users may be linked together based on their relationships within the image-linking graphs. The linking of different user accounts across different platforms may enable sharing of resources among different users (e.g., sharing virtual resources among different user accounts within one or more virtual reality environment, passporting virtual assets from one virtual environment to another virtual environment based on the linking of two accounts with the two virtual environments, etc.).

Figure 1:
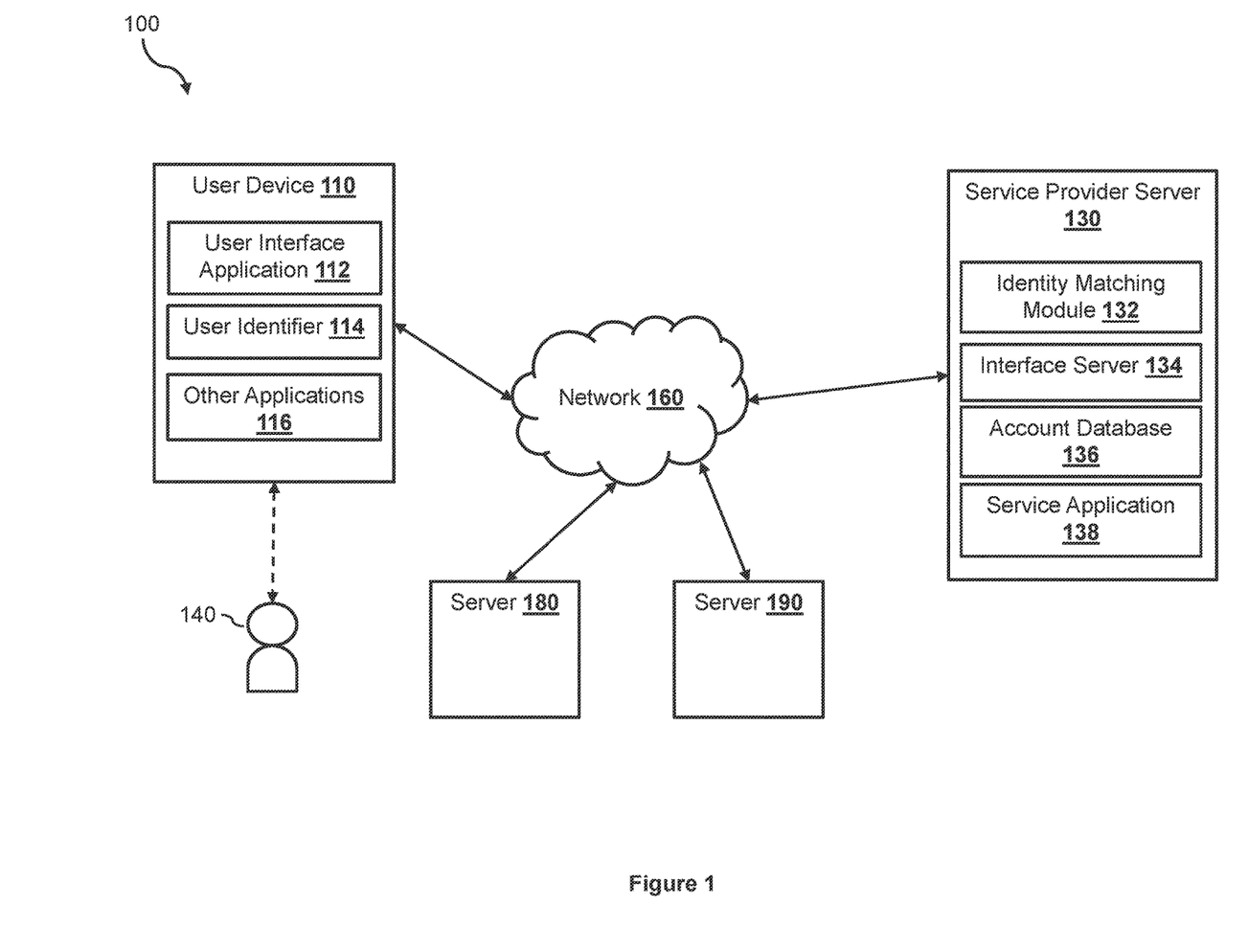
FIG. 1 is a block diagram illustrating an electronic transaction system according to an embodiment of the present disclosure.

FIG. 1 illustrates an electronic transaction system 100, within which the identity matching system may be implemented according to one embodiment of the disclosure. The electronic transaction system 100 includes a service provider server 130, a user device 110, and servers 180 and 190 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 over the network 160. For example, the user 140 may log in to a user account to access account services or conduct electronic transactions (e.g., fund transfer transactions, payment transactions, data access transactions, etc.) with the service provider server 130. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the service provider server 130 over the network 160. In one implementation, the user interface application 112 includes a software program (e.g., a mobile application) that provides a graphical user interface (GUI) for the user 140 to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160. Thus, the user 140 may use the user interface application 112 to initiate electronic transactions with the service provider server 130.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile).

In various implementations, the user 140 is able to input data and information into an input component (e.g., a keyboard) of the user device 110. For example, the user 140 may use the input component to interact with the UI application 112 (e.g., to add a new funding account, to perform an electronic purchase with a merchant, to provide information associated with the new funding account, to initiate an electronic payment transaction with the service provider server 130, to apply for a financial product through the service provider server 130, to access data associated with the service provider server 130, etc.).

While only one user device 110 is shown in FIG. 1, it has been contemplated that multiple user devices, each associated with a different user, may be connected to the service provider server 130 via the network 160.

Each of the servers 180 and 190, in various embodiments, may be configured to host a website that serves content to devices, such as the user device 110 and the service provider server 130. In some embodiments, the content may be generated by the entity associated with the respective servers 180 and 190 (e.g., a news outlet that generate and publish news article, etc.). In some embodiments, the content may be generated and uploaded by different users. For example, the website may be a social media website that enables users to upload user-generated content (e.g., photos, articles, etc.), which may then be shared with other users.

While only two servers 180 and 190 are shown in FIG. 1, it has been contemplated that multiple servers, each associated with a different content-hosting entity, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and other users or merchants. As such, the service provider server 130 may include a service application 138, which may be adapted to interact with the user device 110 and/or the servers 180 and 190 over the network 160 to facilitate the electronic transactions (e.g., electronic payment transactions, data access transactions, etc.) among users and merchants offered by the service provider server 130. In one example, the service provider server 130 may be provided by PayPal®, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include photos associated with the user, a copy of the identification document, private financial information of users and merchants, such as one or more account numbers, passwords, credit card information, banking information, digital wallets used, or other types of financial information, transaction history, Internet Protocol (IP) addresses, device information associated with the user account.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 also includes an identity matching module 132 that implements the identity matching system as discussed herein. The identity matching module 132 may be configured to match user accounts with one or more known entities that are known by the service provider server 130. For example, the identity matching module 132 may have information of a list of unfavorable entities that are known to be malicious to the service provider server 130 (e.g., persons or organizations that have exhibited malicious behavior in the past through various user accounts with the service provider server 130, etc.). The identity matching module 132 may also have information of a list of favorable entities (e.g., important personnel to the organization associated with the service provider server 130, celebrities, etc.) that are favorable to the service provider server 130. The information for each entity may include text-based attributes, such as a name of the entity, a nationality of the entity, and/or other information.

In some embodiments, the identity matching module 132 may initially use a text-based approach to match user accounts with the known entities. For example, the identity matching module 132 may retrieve information associated with each user account from the account database 136. The information retrieved from the account database 136 may include a user profile associated with each user account (e.g., user profiles 272 and 274 in FIG. 2). Each user profile may include text-based data such as a name, a nationality, an age, and other information associated with a user who registered the user account. The identity matching module 132 may determine one or more potential matches between user accounts and each of the known entities under the text-based approach. For example, the identity matching module 132 may determine that a user account is a potential match with an entity when the information associated with the user account corresponds to the information associated with the entity (e.g., the name associated with the user account is a match with the name of the entity, etc.). However, due to how common some of the text-based attributes may be (e.g., a common name, etc.), the text-based approach may yield user accounts that are potential matches with an entity, but are not actually associated with the entity (e.g., users having the same name as the entity).

Figure 2:
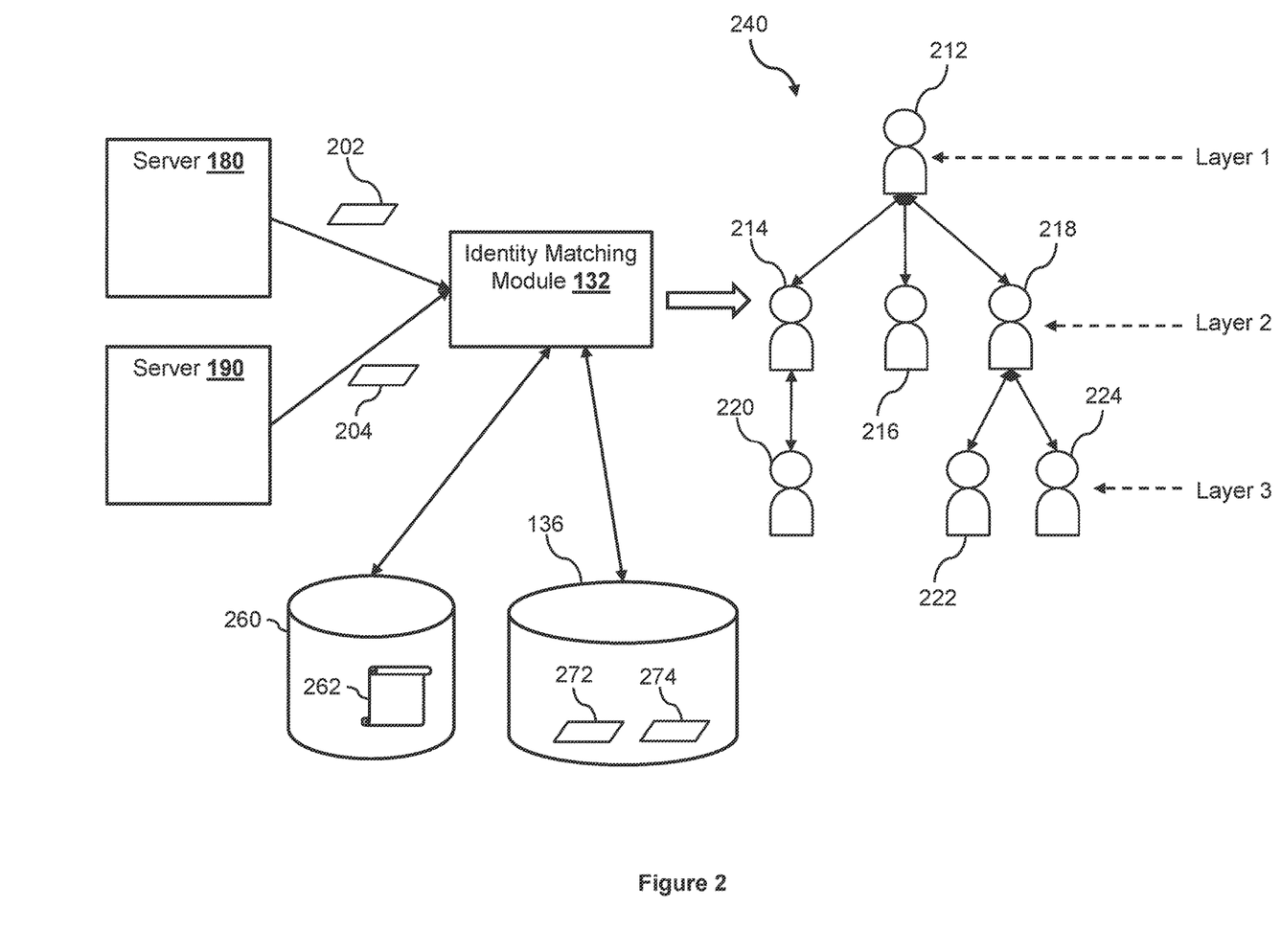
FIG. 2 illustrates an example data flow for generating an image-linking graph for an entity according to an embodiment of the present disclosure.

Thus, in some embodiments, after determining the potential matches for each entity, the identity matching module 132 may verify whether each matched user account is associated with a corresponding entity using an image-linking graph. FIG. 2 illustrates an example data flow for verifying identities associated with user accounts based on image-linking graphs according to various embodiments of the disclosure. In some embodiments, the identity matching module 132 may retrieve images (e.g., photos) related to each entity known to the service provider server 130, and store the images in a data storage (e.g., a data storage 260). The entities may be known to the service provider server 130 based on the service provider server 130 detecting malicious acts that the entities have performed in the past. The entities may also be known to the service provider server 130 based on transaction histories (e.g., a high transaction volume, etc.) of the entities.

The identity matching module 132 may query different servers (e.g., the servers 180 and 190) corresponding to different websites (e.g., a news website, a social media platform, etc.) for content that is related to each entity based on the text-based attributes (e.g., the name of the entity). The identity matching module 132 may obtain, based on the queries, content (e.g., content 202 and 204) from the servers 180 and 190 that is related to an entity, such as a news article, a blog, a tweet, a post, etc. For example, the news article may mention the name of the entity, the blog/tweet/post may be published by the entity or include the name of the entity, etc. The identity matching module 132 may extract images that include one or more persons from the content, and store the images in the data storage 260.

In some embodiments, the identity matching module 132 may use one or more facial recognition algorithms (e.g., visual geometry group (VGG)-based neural networks, a DeepFace recognition, support vector machines, a principal component analysis, a linear discriminant analysis, kernel methods, trace transforms, etc.) to extract facial features of the persons who appear in the photos. The extracted facial features may include multiple parameters corresponding to different feature attributes. For example, feature attributes may include the length and width of a face, the length of the nose, a ratio between the length of the face and the length of the nose, the width of the nose, the width of the lips, the size of the eyes, the size of the eyebrows, etc. In some embodiments, the parameters may include one or more vectors within a multi-dimensional space that represents different facial features (or feature attributes).

The identity matching module 132 may also compare the facial features among the persons appear in the different photos related to the entity (e.g., using a deep-learning CNN), such that the identity matching system may determine whether the photos include the same person or different persons. The identity matching module 132 may assign an identifier to each person that appears in one or more of the photos related to the entity. The identity matching module 132 may then label the person(s) in the photos using the identifiers. Since at least some of the photos may include multiple persons, the identity matching module 132 may identify which person appears in each of the photos and label the persons in the photos using the identifiers. The identity matching module 132 may also associate the extracted facial features from the photos with the corresponding identifier, such that facial features of the same person that are extracted from different photos would be associated with the same identifier. In some embodiments, the identity matching module 132 may merge the facial features extracted from different images of the same person. For example, the identity matching module 132 may compute an average of the parameters corresponding to each feature attribute extracted from the different images, and store the average as the profile for the corresponding identifier.

In this example, the identity matching module 132 may identify seven different persons 212, 214, 216, 218, 220, 222, and 224 that appear in the photos related to the entity. Based on the facial features extracted from the photos, the identity matching module 132 may build a facial profile for each of the persons 212, 214, 216, 218, 220, 222, and 224. In some embodiments, the identity matching module 132 may generate a graph 240 (e.g., an image-linking graph) for the entity based on the persons that appear in the photos related to the entity. For example, the identity matching module 132 may identify a particular person (referred to as the "leader") who appears most frequently in the photos related to the entity and label the corresponding identifier as being most associated with the entity. The assumption is that the person who appears most frequently in the photos related to the entity is an integral person of the entity (e.g., the person is the entity when the entity is a person, the person is a leader of the entity when the entity is a group/organization, etc.). In this example, the identity matching module 132 may determine that the person 212 appears most frequently in the photos related to the entity, and may infer that the person 212 is either the entity or the leader of the entity. The identity matching module 132 may put the identifier corresponding to the person 212 in a first layer of the graph.

As shown, the identity matching module 132 may place the person 212 in Layer 1 of a graph or tree diagram 240. The identity matching module 132 may then identify other people who appear in the same photo(s) as the person 212. Since these other people appear in the same photo(s) as the leader, the identity matching module 132 may determine that these other people may also be closely associated with the entity (e.g., friends/family of the entity, other employees of the entity, etc.). In this example, the identity matching module 132 may determine that the persons 214, 216, and 218 have appeared in the same photos as the person 212. The identity matching module 132 may then place the persons 214, 216, and 218 in the second layer (Layer 2) of the graph 240, and linking each of the persons 214, 216, and 218 to the person 212 since they appear in the same photo(s). In some embodiments, the identity matching module 132 may also generate links between persons in Layer 2 when the two persons also appear in the same photo(s).

In some embodiments, the identity matching module 132 may also assign a relatedness score to each of the links in the graph to represent a level of relationship between the linked people in real-life. For example, the identity matching module 132 may determine a relatedness score for a link between two people in the graph based on a frequency that the two people appear together in the same photos, such that the higher the number of photos that include the two people together, the higher the relatedness score. For example, if a larger number of photos include both the persons 212 and 214 than the persons 212 and 216, the identity matching module 132 may assign a higher relatedness score for the link between the persons 212 and 214 than the link between the persons 212 and 216.

In some embodiments, the graph 240 can also be used by the identity matching module 132 to determine offers (e.g., incentives such as discounts, rewards, etc.) to be provided to different users (via different user accounts). For example, if the identity matching module 132 determines that a user account qualifies certain offers, the identity matching module 132 may provide the offers not only to the user account associated with the leader, but may also provide the offers (or a portion of the offers) to other user accounts associated with persons linked to the leader in the graph 240.

In some embodiments, the identity matching module 132 may continue building out the graph 240 with additional layers. To continue to build out the graph 240, for each of the persons 214, 216, and 218 in the second layer (Layer 2) of the graph 240, the identity matching module 132 may search for photos that include the person and at least one other person. For example, the identity matching module 132 may analyze the photos retrieved from the servers 180 and 190 to determine photos that include a person from Layer 2 in the graph 240, and one other person who is not yet in the graph 240. In some embodiments, the identity matching module 132 may perform a reverse image search to retrieve additional photos that include the persons in Layer 2 of the graph 240. The identity matching system may then identify the other people who appear in the same photos as the person(s) in Layer 2 of the graph 240, and may link those other people in the graph 240 to the person in a third layer (e.g., Layer 3) of the graph 240. For example, the identity matching module 132 may determine that one or more photos include the person 220 and the person 214. Thus, the identity matching module 132 may place the person 220 in Layer 3 of the graph 240 and may link the person 220 to the person 214 in the graph. Furthermore, the identity matching module 132 may determine that one or more photos include the person 218 and the person 222, and that one or more photos include the person 218 and the person 224. Thus, the identity matching module 132 may place the persons 222 and 224 in Layer 3 of the graph 240 and may link the persons 222 and 224 to the person 218 in the graph 240. In some embodiments, the identity matching system may continue to add additional layers in the graph 240 using the same techniques disclosed herein until a predetermined threshold (e.g., 5 layers, 10 layers, etc.) is reached.

Figure 3:
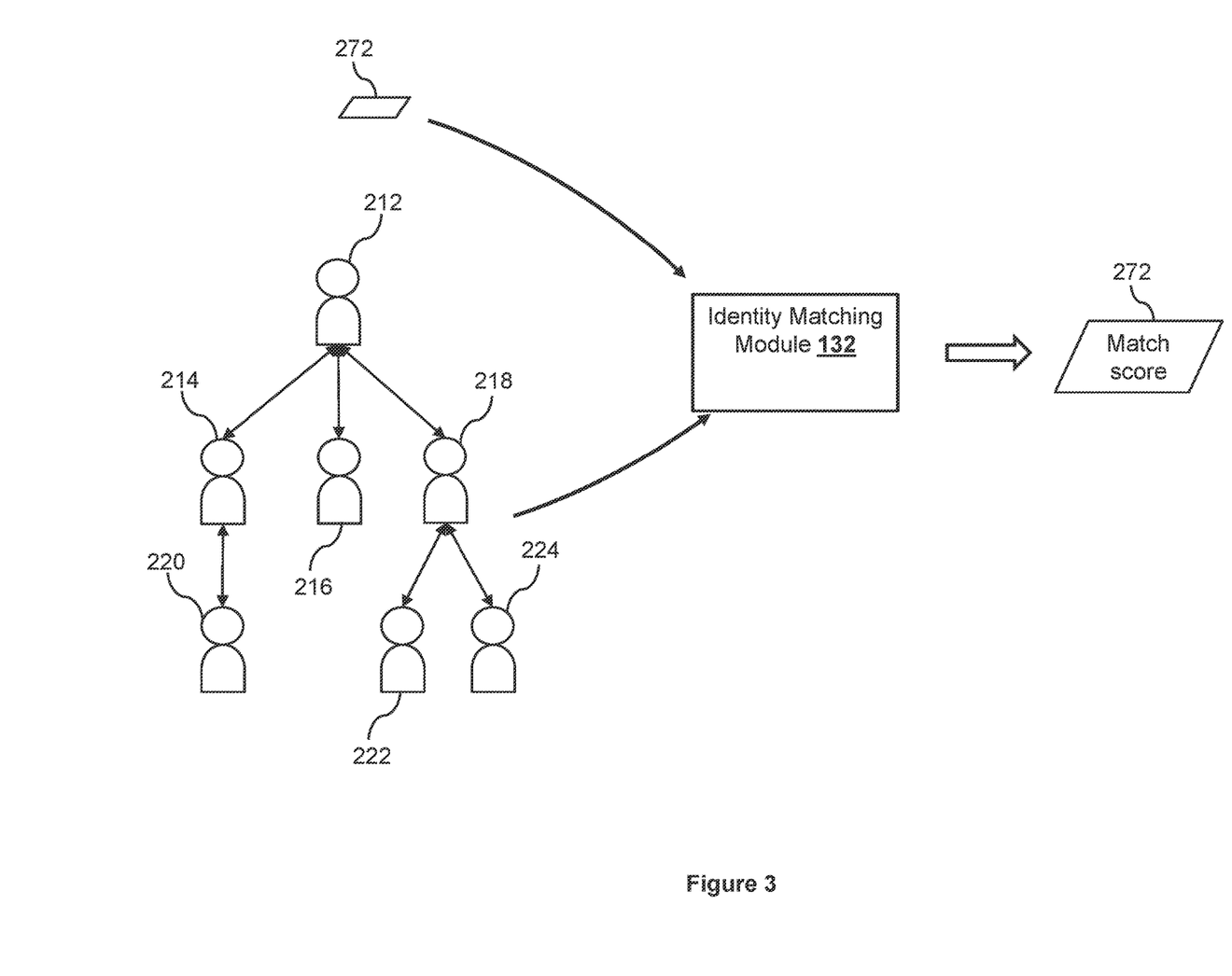
FIG. 3 illustrates an example data flow for verifying an identity of a user according to an embodiment of the present disclosure.

After generating an image-linking graphs (e.g., the graph 240) for each entity in the list, the identity matching module 132 may begin to verify whether a matched user account (that is matched using the text-based approach) is associated with the entity. FIG. 3 illustrates an example data flow for verifying a matched user account according to various embodiments of the disclosure. To verify a matched user account, the identity matching module may access a user profile of the matched user account from the account database 136. The identity matching module 132 may retrieve a photo 272 from the user profile. For example, when a user registers a user account with the service provider server 130, the service provider server 130 may require the user to submit a copy (e.g., an image) of an identification document (e.g., a driver's license, a passport, etc.). The identity matching module 132 may extract the photo 272 of the user from the document (e.g., using a deep-learning CNN, etc.), and store the photo 272 in the user profile.

The identity matching module 132 may compare the photo 272 in the user profile against each person in the image-linking graph (e.g., the graph 240) of the entity. In some embodiments, the identity matching module 132 may generate and train a deep-learning CNN to determine whether facial features extracted from two faces that appear in one or more photos are the same person or different persons. In some embodiments, the deep-learning CNN may be configured to produce a similarity score (e.g., a higher similarity score indicates more similar between the two persons in the photos). The identity matching module 132 may determine that the two faces that appear in the photos are the same person when the similarity score is above a threshold. For example, the identity matching module 132 may also extract facial features of the user from the photo 272 using one or more facial recognition algorithms, and may compare the facial features of the user against the facial features associated with each of the persons 212, 214, 216, 218, 220, 222, and 224 in the image-linking graph. Based on the comparison between the facial features, the identity matching module 132 may determine a probability that the user corresponds to each person associated with the entity (e.g., each person in the graph 240). In some embodiments, the identity matching module 132 may determine that the user is associated with the entity when the probability that the user corresponds to any person in the graph 240 is above a threshold. The threshold, again, maybe be dynamic, and based factors such as type of account, type of organization, etc. For example, higher risk accounts or entities may require a higher threshold.

Based on a determination that the user is associated with the entity, the identity matching system may apply additional configurations to the user account. For example, if the entity is a known unfavorable entity, the identity matching module 132 may apply additional restrictions (e.g., data access restrictions, functionality restrictions, etc.) to the user account, or may even suspend or lock the user account. If the entity is a known favorable entity, the identity matching module 132 may apply or offer additional features or functionalities (e.g., ensure a faster processing time, additional functions that are not offered to other user accounts, etc.) to the user account.

In some embodiments, the identity matching module 132 may dynamically apply different configurations to the user account based on which person (e.g., the matched person) in the graph 240 corresponds to the user of the user account. For example, when the user of the user account corresponds to the person 212 (the leader) in Layer 1 of the graph 240 (indicating that the user is either the entity or the leader of the entity), the identity matching module 132 may apply or offer an entire set of additional configurations to the user account. However, when the user of the user account corresponds to a person in Layer 2 of the graph 240 (indicating that the user is not the entity or the leader of the entity, but someone who is closely associated with the entity), the identity matching module 132 may apply or offer only a portion of the additional configurations (e.g., a subset of additional configurations) to the user account (e.g., only some but not all of the restrictions, etc.). In some embodiments, the portion of additional configurations that is applied or offered to the user account may be dependent on which layer in the graph 240 the person that corresponds to the user of the user account is located. In some embodiments, the higher the layer that the matched person is located, the smaller portion of additional configurations would be applied or offered to the user account. For example, if it is determined that the user corresponds to the person 214, which is located in Layer 2 of the graph 240, a larger portion of the additional configurations would be applied or offered to the user account than, whereas if it is determined that the user corresponds to the person 220, which is located in Layer 3 of the graph 240, a smaller portion of the additional configurations would be applied or offered to the user account.

In some embodiments, the portion of additional configurations that is applied or offered to the user may also be dependent on the relatedness score(s) that link the matched person (the person corresponds to the user) to the person 212 in the graph 240. That is, the more closely the matched person from the graph 240 is related to the person 212 (i.e., the person that is most associated with the entity), the larger portion of the additional configurations will be applied or offered to the user account. In some embodiments, when the matched person is located in Layer 3 (or higher) layer (i.e., the matched person is two-degrees or more separated from the person 212), the identity matching module 132 may assign different weights to the different relatedness scores based on the layers that the link associated with the relatedness scores connect, and may calculate a merged score based on the weighted relatedness scores. For example, the identity matching module 132 may assign a first weight to the links that connect the persons in Layer 2 to the person 212 in Layer 1. The identity matching module 132 may also assign a second weight to the links that connect the persons in Layer 3 and the persons in Layer 2. In some embodiments, the second weight may be less than the first weight since the links that connect the persons in Layer 3 and the persons in Layer 2 are more remote to the person 212 than the links that connect the persons in the Layer 2 and the person 212. After calculating the merged score, the identity matching module 132 may determine a portion of additional configurations to be applied to the user account, and then apply or offer the determined portion of additional configurations to the user account.

In some embodiments, the identity matching module 132 may analyze newly registered user accounts using the image-linking graphs using techniques disclosed herein even without first matching the user accounts with any entity based on the text-based attributes. Malicious users sometimes may use bots (e.g., automated computer programs, etc.) to create multiple user accounts and may register the user accounts with the service provider server 130 using fictitious information. When asked to provide an identification document or an image of the user, the bot may retrieve an image of a person (e.g., an image of a random person) from the Internet, and may use it for registering the user account. In these scenarios, since the information provided by the malicious users to create the account is not information associated with an actual person (for example, the name used to register the account is not the real name of the malicious user), the identity matching module 132 may not be able to match the user accounts with any of the known entities using text-based attributes. Thus, in order for the identity matching module 132 to determine whether the user account is associated with a malicious entity (i.e., used for malicious purposes), the identity matching module 132 may determine whether the user account was created using fictitious information. Such a determination can be based on the photo used by the new user account corresponds to a person associated with an existing user account. As such, the identity matching module 132 may determine whether the photo used by the new user account matches with any other user account using the techniques disclosed herein. For example, the identity matching module 132 may extract facial features from the photo used by the new user account, and may compare the facial features against facial features associated with other existing user accounts (e.g., the facial features extracted from the photos of the user profiles associated with the existing user accounts).

When the identity matching module 132 determines that the photo of the new user account matches with a person associated with an existing user account, the identity matching system may monitor user information and activities associated with the new user account and the matched existing account. If any inconsistency is detected between the two accounts, the identity matching module 132 may determine that the new user account may be registered using fraudulent information and created to conduct malicious activities, and may perform one or more actions (e.g., suspending, locking, etc.) on the new user account. For example, the identity matching module 132 may detect inconsistencies between the two accounts when the text-based attributes (e.g., the name, the age, the nationality, etc.) associated with the two accounts are different (even though the photos of the two accounts indicate that the two accounts are associated with the same person). The identity matching module 132 may also detect inconsistencies when transactions conducted through the two accounts exhibit abnormal behavior, such as when a transaction through the new account and another transaction through the matched account were conducted within a time period (e.g., an hour, a day, etc.) but at two different locations.

In some embodiments, the identity matching module 132 may use the image-linking graph to detect whether a malicious operation is conducted using user accounts with the service provider server 130 through a series of transactions. The series of transactions may be conducted as part of an overarching malicious operation (e.g., a money laundering operation) for the purpose of evading detection. Thus, these malicious operations are generally difficult to detect. In one scenario, a malicious entity may funnel funds through a series of transactions using multiple user accounts with the service provider server 130, as part of a malicious operation (e.g., a money laundering operation). For example, funds may be transferred from a first account to a second account, and then from the second account to a third account, and then from the third account to a fourth account before the funds is withdrawn. If the entire series of transactions are conducted through user accounts with the service provider server 130, the service provider server 130 may detect the malicious behavior by tracing the transactions through the different user accounts involved in the series of transactions. However, the malicious entity may attempt to evade detection by performing at least one transaction in the series of transactions outside of an environment controlled by the service provider server 130 (e.g., using an account with a different organization, using cash transfer, etc.). Thus, after transferring funds from the first account to the second account, the funds may be transferred to an external account (e.g., external to the organization) before transferring back to the third account in the series of transactions.

In some embodiments, when a known malicious entity conducts a transaction (e.g., a seed transaction) through a user account (e.g., the identity matching system may match the user account with the known malicious entity using the techniques disclosed herein, such as an account associated with the person 212, etc.), the identity matching module 132 may trace the downstream (and/or upstream) transactions from the user account of the known malicious entity. In some embodiments, the identity matching module 132 may identify other user accounts that are closely associated with the known malicious entity using the image-linking graph (e.g., the graph 240). For example, after building the graph 240 for the known malicious entity, the identity matching module 132 may scan through the user accounts to identify one or more user accounts that are associated with each person in the graph 240 (e.g., the photo associated with the user account corresponds to that person in the graph 240). For example, the identity matching module 132 may identify a user account that is associated with the person 212, another user account that is associated with the person 214, another user account that is associated with the person 216, another user account that is associated with the person 218, another user account that is associated with the person 220, another user account that is associated with the person 222, and another user account that is associated with the person 224.

The identity matching module 132 may monitor transactions conducted through the identified user accounts (e.g., user accounts associated with the person 214, 216, 218, 220, 222, and 224). The identity matching system may monitor transactions conducted through the user account of the known malicious entity and the identified user accounts determined to be closely associated with the known malicious entity within a period of time (e.g., within an hour, within a day, etc.) from the seed transaction, and may determine whether the transactions conducted by those accounts as a whole correspond to a pattern associated with a malicious behavior (e.g., a series of funds transfer transaction through the user accounts which corresponds to a money laundering operation). If the transactions correspond to the pattern, the identity matching system may perform one or more actions to the user accounts (e.g., suspending, locking, etc.).

In some embodiments, based on the relationships determined by the identity matching module 132 among the user accounts (from the graph 240), and the detected series of transactions, the identity matching module 132 may improve efficiency of the future transactions. For example, if it is detected that the series of transactions occur in a regular (e.g., periodic) basis, the identity matching module 132 may automate the series of transactions. In some embodiments, to improve efficiency, the identity matching module 132 may directly transfer funds from the first account (e.g., the account associated with the person 212) to the last account (e.g., the account associated with the person 224) without going through the intermediary accounts (e.g., the accounts associated with the persons 214, 216, 218, 220, and 222).

Figure 4:
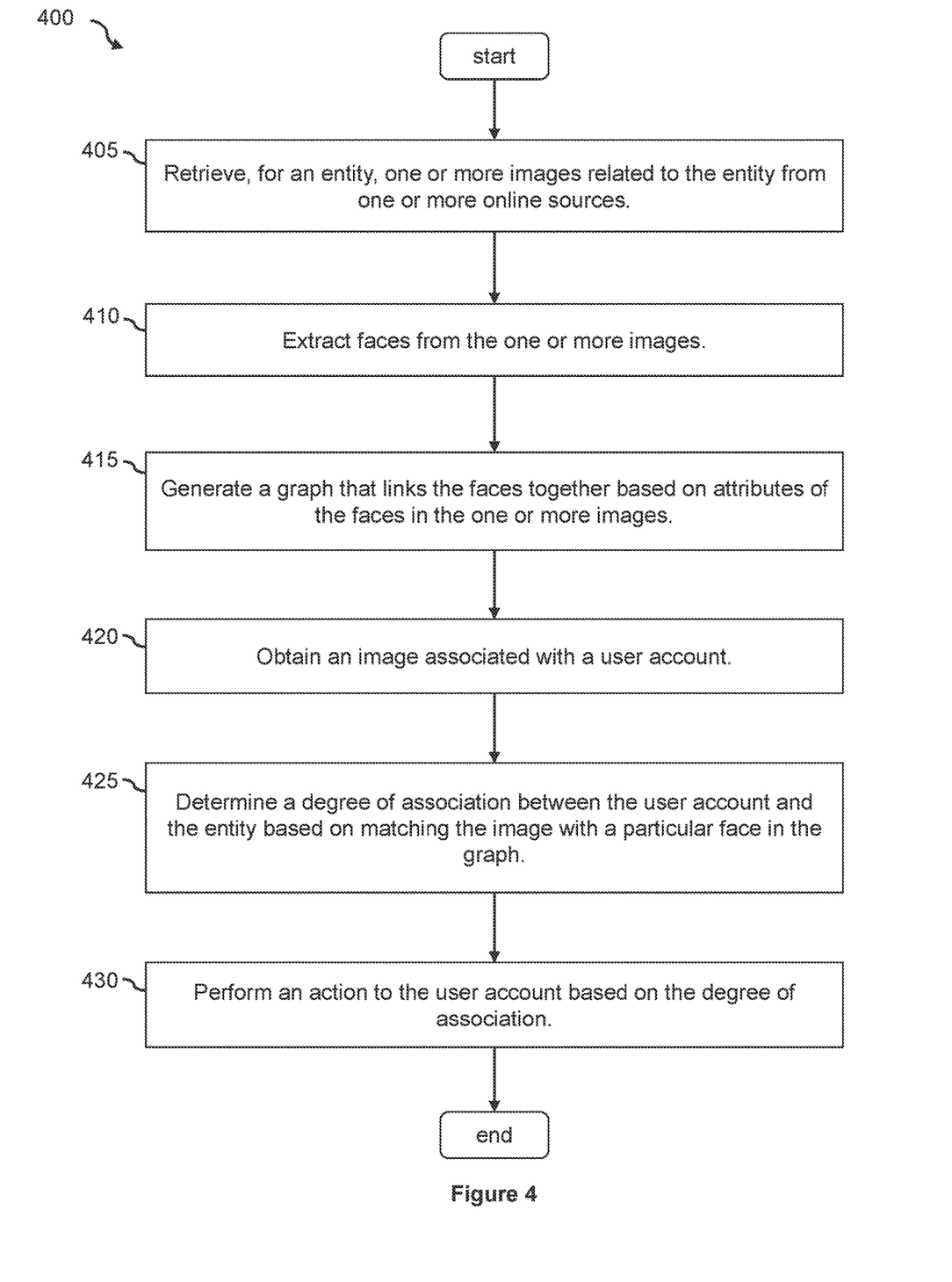
FIG. 4 is a flowchart showing a process of verifying an identity of a user associated with a user account using image-linking graphs according to an embodiment of the present disclosure.

FIG. 4 illustrates a process 400 for verifying an identity associated with a user account using image-linking graphs according to various embodiments of the disclosure. In some embodiments, at least a portion of the process 400 may be performed by the identity matching module 132. The process 400 begins by retrieving (at step 405), for an entity, one or more images related to the entity from one or more online sources. For example, the identity matching module 132 may include a list of known entities (e.g., favorable entities, unfavorable entities, etc.). For each of the entities, the identity matching module 132 may query servers (e.g., the servers 180 and 190) for content related to the entity. The identity matching module 132 may extract images from the content.

The process 400 then extracts (at step 410) faces from the one or more images and generates (at step 415) a graph that links the faces together based on attributes of the faces in the one or more images. For example, the identity matching module 132 may extract facial features from the persons that appear in the photos using one or more facial recognition techniques. Based on the extracted facial features, the identity matching module 132 may identify the persons in the photos, that is, to determine if two faces from the photos are associated with the same person or different persons. The identity matching module 132 may generate an image-linking graph (e.g., the graph 240) based on the faces that appear on the photos. For example, the identity matching module 132 may place the face (e.g., the leader) that appears most frequently in the photos in Layer 1 of the graph 240. The identity matching module 132 may then identify faces that appear in the same photos as the leader, and place those faces in Layer 2 of the graph 240. The identity matching module 132 may continue to build out the graph 240 in the same manner using the techniques disclosed herein.

The process 400 then obtains (at step 420) an image associated with a user account and determines (at step 425) a degree of association between the user account and the entity based on matching the image with a particular face in the graph. For example, the identity matching module 132 may retrieve a user profile associated with the user account from the account database 136. From the user profile, the identity matching module 132 may obtain an image of a user associated with the user account (e.g., extracted from an identification document of the user, etc.). The identity matching module 132 may extract facial features of the user's face that appear in the image using one or more facial recognition techniques, and may compare the facial features of the user against the facial features of each of the persons in the graph 240, for example, using a deep-learning CNN.

Based on the comparison, the identity matching module 132 may determine whether the user corresponds to any person in the graph 240, and may determine a degree of association between the user account and the entity based on which person in the graph 240 corresponds to the user. For example, if the user corresponds to the person 212 (the leader) in Layer 1 of the graph 240, the identity matching module 132 may determine that the user account is highly associated with the entity (e.g., 100% association). If the user corresponds to any other person in the graph 240, the identity matching module 132 may determine that the user is somewhat associated with the entity. In some embodiments, the identity matching module 132 may determine the level of association between the user account and the entity based on the location of the matched person in the graph 240. For example, the closer the matched person is to the leader (e.g., the leader 212) of the entity in the graph 240, a higher level of association may be determined between the user account and the entity. In some embodiments, the identity matching module 132 may also use the relatedness scores assigned to the links to determine the level of association between the user account and the entity.

The process 400 then performs (at step 430) an action to the user account based on the degree of association. For example, the identity matching module 132 may determine a set of configurations to be applied to the user account if the user account corresponds to the entity. In some embodiments, if the user account is determined to be highly associated (e.g., 100% association) with the entity, the identity matching module 132 may apply the set of configurations (e.g., a set of restrictions, a set of additional features, etc.) to the user account. In some embodiments, the identity matching module 132 may determine a portion of the configurations (e.g., a subset of configurations) to be applied to the user account based on the level of association between the user account and the entity, such that a larger portion of configurations is applied or offered to the user account if the user account has a higher degree of association with the entity and a smaller portion of configurations is applied to the user account if the user account has a lower degree of association with the entity.

Figure 5:
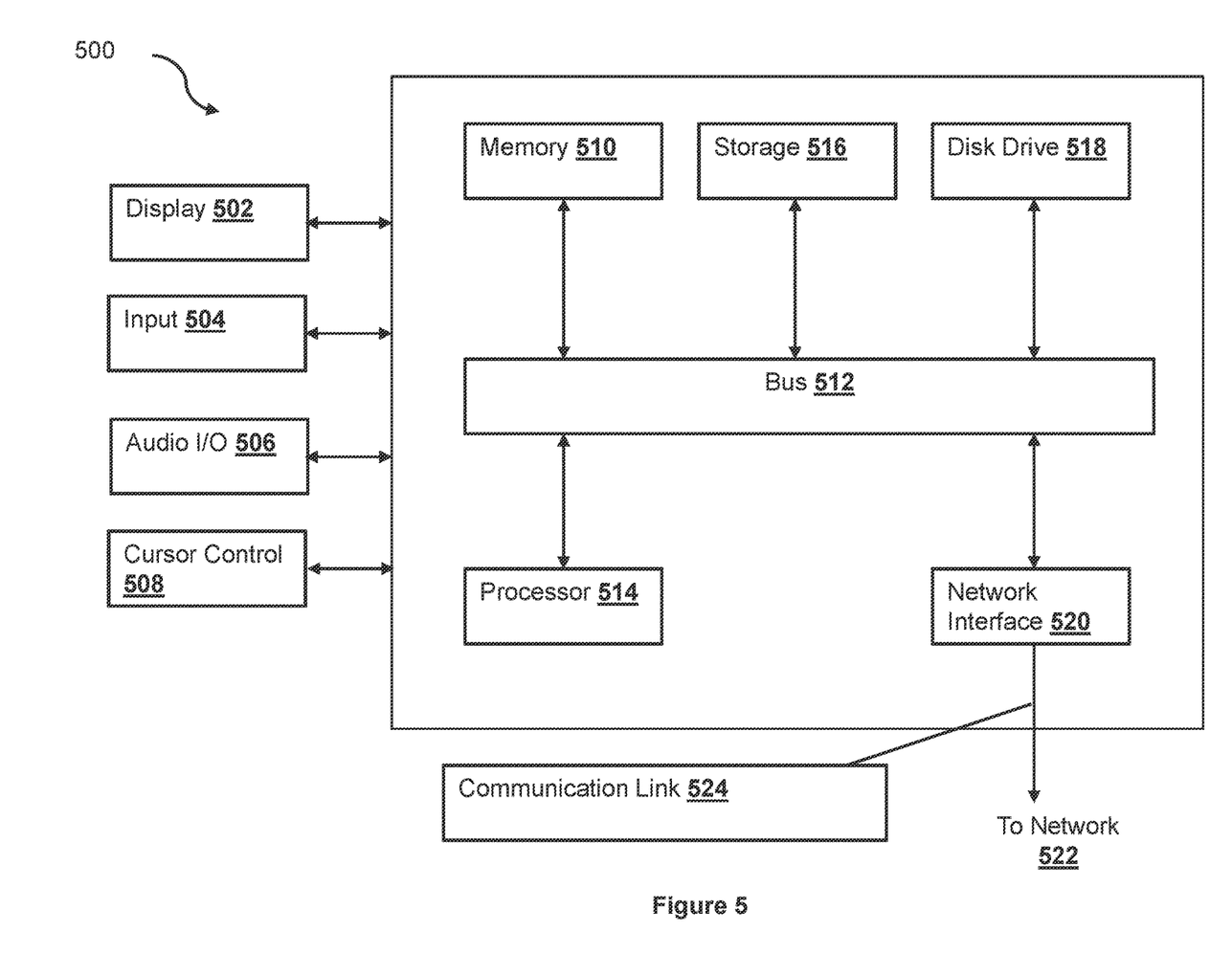
FIG. 5 is a block diagram of a system for implementing a device according to an embodiment of the present disclosure.

FIG. 5 is a block diagram of a computer system 500 suitable for implementing one or more embodiments of the present disclosure, including the service provider server 130, the user device 110, and the servers 180 and 190. In various implementations, the user device 110 may include a mobile cellular phone, personal computer (PC), laptop, wearable computing device, etc. adapted for wireless communication, and each of the service provider server 130 and the servers 180 and 190 may include a network computing device, such as a server. Thus, it should be appreciated that the devices 110, 130, 180, and 190 may be implemented as the computer system 500 in a manner as follows.

The computer system 500 includes a bus 512 or other communication mechanism for communicating information data, signals, and information between various components of the computer system 500. The components include an input/output (I/O) component 504 that processes a user (i.e., sender, recipient, service provider) action, such as selecting keys from a keypad/keyboard, selecting one or more buttons or links, etc., and sends a corresponding signal to the bus 512. The I/O component 504 may also include an output component, such as a display 502 and a cursor control 508 (such as a keyboard, keypad, mouse, etc.). The display 502 may be configured to present a login page for logging into a user account or a checkout page for purchasing an item from a merchant. An optional audio input/output component 506 may also be included to allow a user to use voice for inputting information by converting audio signals. The audio I/O component 506 may allow the user to hear audio. A transceiver or network interface 520 transmits and receives signals between the computer system 500 and other devices, such as another user device, a merchant server, or a service provider server via network 522. In one embodiment, the transmission is wireless, although other transmission mediums and methods may also be suitable. A processor 514, which can be a micro-controller, digital signal processor (DSP), or other processing component, processes these various signals, such as for display on the computer system 500 or transmission to other devices via a communication link 524. The processor 514 may also control transmission of information, such as cookies or IP addresses, to other devices.

The components of the computer system 500 also include a system memory component 510 (e.g., RAM), a static storage component 516 (e.g., ROM), and/or a disk drive 518 (e.g., a solid-state drive, a hard drive). The computer system 800 performs specific operations by the processor 514 and other components by executing one or more sequences of instructions contained in the system memory component 510. For example, the processor 514 can perform the identity verification functionalities described herein, for example, according to the process 400.

Logic may be encoded in a computer readable medium, which may refer to any medium that participates in providing instructions to the processor 514 for execution. Such a medium may take many forms, including but not limited to, non-volatile media, volatile media, and transmission media. In various implementations, non-volatile media includes optical or magnetic disks, volatile media includes dynamic memory, such as the system memory component 510, and transmission media includes coaxial cables, copper wire, and fiber optics, including wires that comprise the bus 512. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 500. In various other embodiments of the present disclosure, a plurality of computer systems 500 coupled by the communication link 524 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   a non-transitory memory; and
   one or more hardware processors coupled with the non-transitory memory and configured to read instructions from the non-transitory memory to cause the system to perform operations comprising:
   predicting that a user account is related to an entity based on identity information of the user account;
   obtaining an image associated with a person of the user account;
   accessing a graph associated with the entity and generated based on one or more images related to the entity, wherein the graph links a plurality of persons, and wherein two persons from the plurality of persons are linked in the graph when the two persons appear in at least one image of the one or more images related to the entity;
   determining that the person is included in the graph based on the image associated with the person of the user account;
   determining a set of user accounts associated with a set of persons other than the person in the graph based on the one or more images;
   monitoring one or more transactions conducted through the user account and the set of user accounts within a time period;
   determining, based on the monitoring, that a series of transactions that involve the user account and the set of user accounts corresponds to a pattern; and
   in response to determining that the series of transactions corresponds to the pattern, performing one or more actions to the set of user accounts based on one or more positions of the set of persons in the graph.

2. The system of claim 1, wherein the identity information comprises a name of a person.

3. The system of claim 1, wherein the operations further comprise:
   assigning an association score to each corresponding person in the graph based on an appearance frequency of the corresponding person in the one or more images, wherein the association score represents a level of relatedness between the corresponding person and the entity.

4. The system of claim 1, wherein the operations further comprise:
   identifying, from the plurality of persons in the graph, a first person being representative of the entity; and
   assigning the first person to a first position in the graph based on the first face person being representative of the entity.

5. The system of claim 4, wherein the operations further comprise:
   assigning a second person to a second position in the graph based on a frequency that the second person appears with the first person in the one or more images.

6. The system of claim 4, wherein the operations further comprise:
   assigning a second person to a second position in the graph based on a location of the second person with respect to the first person in a particular image of the one or more images.

7. The system of claim 1, wherein the operations further comprise:
   detecting the plurality of persons within the one or more images using one or more facial recognition techniques.

8. A method comprising:
   determining, by one or more hardware processors, that a user account is associated with an entity based on information of the user account;
   obtaining, by the one or more hardware processors, an image associated with a person of the user account;
   accessing, by the one or more hardware processors, a graph associated with the entity based on the image associated with the person, wherein the graph was generated based on one or more images associated with the entity, wherein the graph links a plurality of persons comprising the user, and wherein two persons from the plurality of persons are linked in the graph when the two persons appear in at least one of the one or more images;
   determining, by the one or more hardware processors, a set of user accounts associated with a set of persons other than the person in the graph;
   monitoring, by the one or more hardware processors, one or more transactions conducted through the user account and the set of user accounts within a time period;
   determining, by the one or more hardware processors and based on the monitoring, that a series of transactions that involve the user account and the set of user accounts corresponds to a pattern; and
   in response to determining that the series of transactions corresponds to the pattern, performing, by the one or more hardware processors, one or more actions to the set of user accounts based on one or more positions of the set of persons in the graph.

9. The method of claim 8, further comprising:
   determining that the entity is associated with a bad actor based on one or more previous transactions processed through a second user account associated with the entity.

10. The method of claim 8, wherein the performing the one or more actions comprises applying a set of restrictions to the set of user accounts.

11. The method of claim 8, further comprising:
    determining that the entity is a favorable entity based on one or more previous transactions processed through a second user account associated with the entity.

12. The method of claim 11, wherein the performing the one or more actions comprises applying or offering a set of additional functionalities to the set of user accounts.

13. The method of claim 8, wherein the performing the one or more actions comprises suspending the set of user accounts.

14. The method of claim 8, further comprising:
assigning an association score to each corresponding person in the graph based on an appearance frequency of the corresponding person in the one or more images, wherein the association score represents a level of relatedness between the corresponding person and the entity, and wherein the performing the set of actions is further based on the association score assigned to each corresponding person.

15. A non-transitory machine-readable medium having stored thereon machine-readable instructions executable to cause a machine to perform operations comprising:
determining a match between a user account and an entity based on identity information associated with the user account;
obtaining an image associated with the user account;
accessing a graph associated with the entity and generated based on one or more images associated with the entity, wherein the graph links a plurality of persons associated with the entity, and wherein two persons from the plurality of persons are linked in the graph when the two persons appear in at least one of the one or more images;
identifying a person from the graph corresponding to the user account based on the image associated with the user account;
determining a set of user accounts associated with a set of persons other than the person in the graph;
monitoring, by the one or more hardware processors, one or more transactions conducted through the user account and the set of user accounts within a time period;
determining, by the one or more hardware processors and based on the monitoring, that a series of transactions that involve the user account and the set of user accounts corresponds to a pattern; and
in response to determining that the series of transactions corresponds to the pattern, performing one or more actions to the set of user accounts based on one or more positions of the set of persons in the graph.

16. The non-transitory machine-readable medium of claim 15, wherein the identity information comprises a name and a location of the person.

17. The non-transitory machine-readable medium of claim 15, wherein the operations further comprise:
assigning an association score to each corresponding person in the graph based on an appearance frequency of the corresponding person in the one or more images, wherein the association score represents a level of relatedness between the corresponding person and the entity.

18. The non-transitory machine-readable medium of claim 15, wherein the operations further comprise:
identifying, from the plurality of persons in the graph, a first person being representative of the entity; and
assigning the first person to a first position in the graph based on the first person being representative of the entity.

19. The non-transitory machine-readable medium of claim 18, wherein the operations further comprise:
assigning a second person to a second position in the graph based on a frequency that the second person appears with the first person in the one or more images.

20. The non-transitory machine-readable medium of claim 18, wherein the operations further comprise:
assigning a second person to a second position in the graph based on a location of the second person with respect to the first person in a particular image of the one or more images.

* * * * *

UNITED STATES PATENT AND TRADEMARK OFFICE
CERTIFICATE OF CORRECTION

PATENT NO. : 12,132,727 B2
APPLICATION NO. : 17/824539
DATED : October 29, 2024
INVENTOR(S) : Ramnarayan Vijapur Gopinath Rao, Rajkumar Baskaran and Rishabh Goel Page 1 of 1

It is certified that error appears in the above-identified patent and that said Letters Patent is hereby corrected as shown below:

In the Claims

Claim 4, Column 21, Line 66, change "based on the first face person being representative of" to --based on the first person being representative of--.

Signed and Sealed this
Seventh Day of January, 2025

Derrick Brent
*Acting Director of the United States Patent and Trademark Office*